G. M. PORTER.
HELICAL CONVEYER.
APPLICATION FILED SEPT. 24, 1913.
1,113,688.
Patented Oct. 13, 1914.
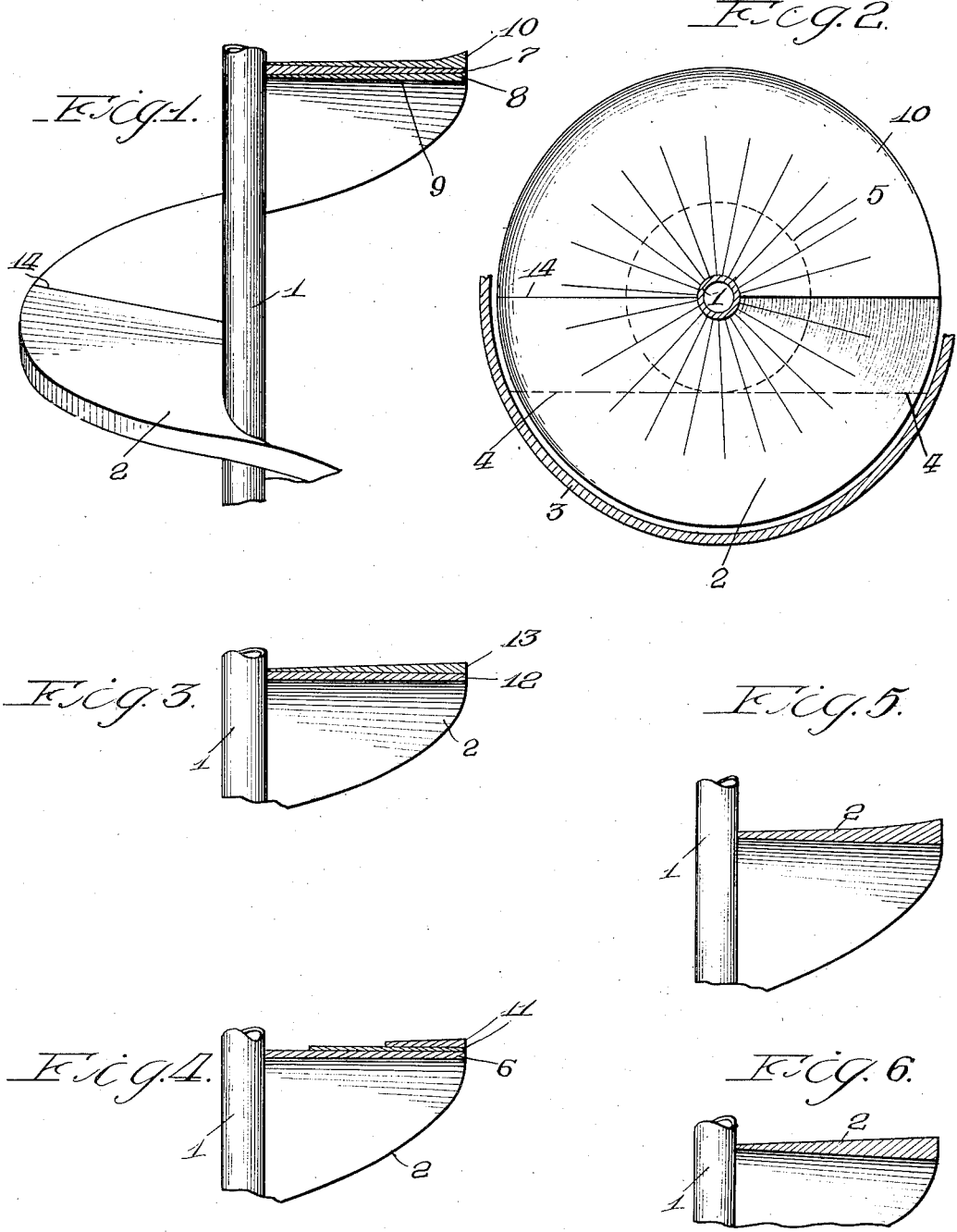

UNITED STATES PATENT OFFICE.

GLEN M. PORTER, OF CHICAGO, ILLINOIS.

HELICAL CONVEYER.

1,113,688. Specification of Letters Patent. Patented Oct. 13, 1914.

Application filed September 24, 1913. Serial No. 791,508.

*To all whom it may concern:*

Be it known that I, GLEN M. PORTER, citizen of the United States, residing at Chicago, in the county of Cook and State of Illinois, have invented certain new and useful Improvements in Helical Conveyers; and I do hereby declare the following to be a full, clear, and exact description of the invention, such as will enable others skilled in the art to which it appertains to make and use the same.

My invention relates to spiral or screw conveyers and more particularly to the helically disposed member forming the distinctive operative element of such conveyers.

The prime object of my invention is to provide a helical conveyer member affording increased durability in the radially outward portions which are subjected to a larger amount of wear than the portions disposed nearer to the axis of the conveyer.

Another object of my invention is to provide a helical conveyer member which will tend to move some of the material propelled by the said member from its periphery toward its axis, thereby distributing the wear over a larger portion of the face of the said member.

Still another object is to provide a conveyer member having its rear face so disposed as to produce a minimum of disturbing or frictional effect upon the material behind the same.

I accomplish these objects by the construction shown in the drawings, in which—

Figure 1 is a fragmentary view of a conveyer shaft equipped with the conveyer blade or screw of my invention. Fig. 2 is a fragmentary longitudinal view of the same and of a portion of a trough housing the same. Figs. 3, 4, 5 and 6 are fragmentary views showing alternative designs of the helical conveyer member of my invention.

In the drawings, my invention is shown as applied to a conveyer comprising a tubular shaft 1 having a helically disposed operative member 2 secured thereto. It has been customary heretofore to construct such helical conveyer members with a radial section either uniform in thickness all the way from its radially inner to its outer edges, or gradually tapering in thickness from a maximum adjacent to the shaft to a minimum thickness at its periphery. When such a conveyer member is used with its axis in a substantially horizontal position for propelling grain or other materials in a trough 3, as in Fig. 2, the extent to which the grain comes into contact with the helical member will depend on the amount of grain in the trough. Thus if the trough is only filled to the line 4—4, the active portion of the helical conveyer member will be substantially that radially outward of the dotted circle 5, hence this radially outer portion will receive the wear instead of having the same distributed over the entire helical surface of the conveyer. Consequently, such a conveyer member when used with varying quantities of materials will wear much more rapidly in its radially outer portions than in those portions radially inward thereof. Hence, a conveyer member of uniform section as shown at 6, will be rapidly worn thin at its outer edge, while this wearing will be relatively still more rapid if the conveyer member is thicker at its inner than at its outer edge, as at 7. To compensate for this uneven wearing when using a conveyer member having a taper which provides increased rigidity and an enlarged bearing surface against the shaft, such as the member 7 of Fig. 1, I reinforce the said member by an auxiliary helical member 8 contiguous at all points to the back thereof and secured thereto. The auxiliary backing 8 may be sweated or otherwise rigidly secured to the main member 7 so as to be rigid therewith at all points, and this auxiliary backing preferably has its rear surface 9 disposed at right angles to the axis of the conveyer so as to produce a minimum of friction by contact with the material behind it. To further increase the resistance of the radially outward portions of the helical conveyer member to wear, I also superpose upon the front face thereof an auxiliary member 10 of greater thickness at its radially outer portions than at those nearer to its axis, the increase in thickness being gradually augmented from the inner edge of the said auxiliary member to its periphery, thereby causing the forward face of the resulting composite member to act as a cam surface tending to move the material engaged and propelled by the same from the periphery of the said member toward its axis. It will be obvious that any such shifting of the propelled material toward the axis of the conveyer will distribute the wear upon the latter over a larger portion of the forward surface of the said member, hence the gradually augmented increase in thickness of the helical conveyer member from its inner to its outer edge serves the double purpose of affording a greater thickness at the points receiving the greater wear, and of distributing the wear over a larger portion of the conveyer member than would receive that if constructed after the manner heretofore customary.

Instead of securing auxiliary members to the opposite faces of the main member 7, as in Fig. 1, a plurality of auxiliary members 11 may be successively superposed forwardly of the main member, as in Fig. 4, in which case the outer of the auxiliary members preferably has its forward face disposed at a more acute angle with the axis of the conveyer than the member disposed rearwardly of the same.

While I have shown helical conveyer members in Figs. 1 and 4 consisting of three superposed portions, I do not wish to be limited to this particular embodiment of my invention. Thus, Fig. 3 shows the members 7 and 8 of Fig. 1 combined into a single rearward member 12 having a single forward auxiliary member 13 superposed thereon, while Fig. 5 shows all three of the portions constituting the composite helical member of Fig. 1 as combined integrally into a single member 2 having its rear face disposed substantially at right angles to the axis of the conveyer and having its forward face portions disposed at acute angles with its said axis, the said acute angles diminishing in size from the radially inner to the radially outer portions of the said member.

It will be obvious that the helical conveyer member of my invention may either be made in continuous lengths or sections, or in flights such as the sections joined at their abutting ends along the dotted line 14 of Fig. 1. Also that the helical conveyer member may either be rolled or formed to shape out of uncut pieces of sheet material, or formed out of sheets or bars having gussets cut at regular intervals from one edge thereof to provide for the contraction of the said edge, as shown in Fig. 2, it being possible to vary the details of the construction in many ways without departing from the spirit of my invention. For example, the thickening of the helical member might be uniformly distributed with respect to radial lines 16 at right angles to the axis of the said member, as shown in Fig. —6—.

I claim as my invention:—

1. A conveyer comprising a shaft and a helical blade mounted thereon, the said blade gradually diminishing in thickness from its outer peripheral edge portions to its portions contiguous to the shaft.

2. In a helical conveyer, a shaft and a composite helical member secured thereto, the said member comprising main and auxiliary portions, the latter of said portions mounted upon the former and so shaped and disposed as to make the resulting composite member increase in thickness radially outward from the said shaft.

3. In a helical conveyer, a shaft, and a composite helical member secured thereto and comprising in contiguous formation main and auxiliary portions, the former of said portions tapering from a maximum thickness adjacent to the shaft to a minimum thickness adjacent to the periphery of the said member, the latter of said portions also of tapering radial section, the resulting helical member tapering in section from a minimum thickness at the shaft to a maximum thickness at its periphery.

4. In a helical conveyer, a helical member built up of superposed main and auxiliary portions, one thereof tapering in section from its periphery to its inner edge, the resulting composite member being of greater thickness at given points than at points radially inward therefrom.

5. A conveyer comprising a shaft and a helical blade mounted thereon; the said blade varying in thickness from a minimum at the portion contiguous to the juncture of the blade with the shaft, to a maximum at the outer peripheral edge portion of the blade, the intermediate portions increasing in thickness from the former to the latter of the aforesaid portions.

6. In a helical conveyer, a helical member having its radial section increasing in thickness at a gradually augmented rate from its radially inner to its radially outer portions.

7. A conveyer comprising a shaft and a helical blade mounted thereon; the said blade varying in thickness from a minimum at the portion contiguous to the juncture of the blade with the shaft, to a maximum at the outer peripheral edge portion of the blade, the intermediate portions increasing in thickness from the former to the latter of the aforesaid portions, one face of said blade being radially perpendicular to the axis of said shaft at all points.

8. In a conveyer, a helical blade having substantially uniform sections radially of its axis, the said sections being of greater thickness radially outward than radially inward of the said axis, one face of the said section so disposed relatively to the said axis as to cause the said blade to tend to move the material encountered by the said face centripetally of the conveyer, the said radially outward thickening of the blade operating both to strengthen the outer edge thereof and to produce the said centripetal effect.

In testimony whereof I have signed my name in presence of two subscribing witnesses.

GLEN M. PORTER.

Witnesses:
R. W. LOTZ,
M. M. BOYLE.